UNITED STATES PATENT OFFICE.

CHARLIE F. MORRIS AND THOMAS CHENEVERT, OF BLENCOE, IOWA.

FUMIGATING COMPOUND.

SPECIFICATION forming part of Letters Patent No. 450,522, dated April 14, 1891.

Application filed January 15, 1891. Serial No. 377,899. (No specimens.)

*To all whom it may concern:*

Be it known that we, CHARLIE F. MORRIS and THOMAS CHENEVERT, citizens of the United States of America, residing at Blencoe, in the county of Monona and State of Iowa, have invented certain new and useful Improvements in Fumigating Compounds, of which the following is a specification.

This invention relates to certain new and useful improvements in fruit and vegetable preservation; and it has for its object the production of a cheap, simple, and efficient compound for impregnating the preserving-water in which the fruits or vegetables are placed.

The compound consists of the following ingredients: sulphur, one and one-quarter pound; white sugar, (granulated,) one-quarter pound; charcoal, one-quarter pound; wood-ashes, one tea-spoonful; fine salt, one-half tea-spoonful. These ingredients are finely ground and thoroughly intermixed or intermingled by being passed through a suitable sieve.

For preserving meat and fish one-fourth ounce of saltpeter is added to the above compound.

The *modus operandi* is as follows: An airtight box or room must be used for carrying out the process. In this box or room the fruits and vegetables are preferably placed in suspended open baskets, or upon shelves, so as to be well exposed to the fumes. A suitable number of earthern jars or wooden pails containing water are also placed in this box or room, and an open dish supplied with our improved compound is then placed in the box or room. The compound is then ignited, and the door being closed the burning compound is allowed to remain in the box or room for one hour or more. In this manner the water in the jars or pails is thoroughly impregnated with the fumes arising from the ignited compound. The articles to be preserved—fruit or vegetables—are placed in the jars or vessels in which they are to be permanently kept, and the fumigated water is then placed therein in sufficient quantity to cover the fruit or vegetables. A thin cloth is bound around the top of each jar or vessel, and the latter is then put in a cool place to remain until it is desired to use the same.

Such fruits and vegetables as oranges, lemons, bananas, and potatoes are fumigated in about four hours, and can be placed away in a cool room dry and in their natural state. Corn may be cut off or preserved on the cob. Peaches, pears, plums, apples, and tomatoes may be preserved either in their natural state or sliced up. Fresh meat or fish will be thoroughly fumigated in one or two hours, and may be hung in a cool room or packed down in barrels or boxes. Butter, eggs, and cider may also be preserved by our process.

We claim as our invention—

1. The herein-described preserving or fumigating compound for fruit, vegetables, and the like, consisting of sulphur, white sugar, charcoal, wood-ashes, and fine salt, as set forth.

2. The herein-described preserving or fumigating compound for meat and fish, consisting of sulphur, white sugar, charcoal, wood-ashes, fine salt, and saltpeter, as set forth.

In testimony whereof we affix our signatures in presence of two witnesses.

CHARLIE F. MORRIS.
THOMAS CHENEVERT.

Witnesses:
  MAY MORRIS,
  JOHN MORRIS.